United States Patent [19]

Hasegawa et al.

[11] Patent Number: 5,785,901
[45] Date of Patent: Jul. 28, 1998

[54] GAS-LIQUID CONTACT APPARATUS

[75] Inventors: Shigeo Hasegawa; Noohiko Ukawa; Kenji Iwasaki, all of Hiroshima-ken; Tamotsu Higuchi; Koichiro Iwashita, both of Tokyo, all of Japan

[73] Assignee: Mitsubishi Heavy Industries, Ltd., Tokyo, Japan

[21] Appl. No.: 861,381

[22] Filed: May 21, 1997

[30] Foreign Application Priority Data

Jun. 4, 1996 [JP] Japan ................. 8-141622

[51] Int. Cl.$^6$ ................. B01F 3/04
[52] U.S. Cl. ................. 261/117; 95/224; 95/235; 261/DIG. 9
[58] Field of Search ................. 261/115–118, DIG. 9; 55/228, 229; 239/550, 566; 95/223–225, 230, 235; 423/243.01–243.12; 422/168, 172

[56] References Cited

U.S. PATENT DOCUMENTS

| 3,615,199 | 10/1971 | Terrana et al. | 55/228 X |
| 4,515,754 | 5/1985 | Stehning | 422/168 |
| 5,076,818 | 12/1991 | Jonsson | 95/235 X |
| 5,512,072 | 4/1996 | Laslo | 261/117 X |
| 5,540,760 | 7/1996 | Risse et al. | 55/228 X |
| 5,605,552 | 2/1997 | Shimizu et al. | 423/243.08 X |
| 5,605,655 | 2/1997 | Ishihara et al. | 261/116 |
| 5,616,290 | 4/1997 | Ishihara et al. | 239/550 X |
| 5,641,460 | 6/1997 | Okazoe et al. | 422/172 X |
| 5,665,129 | 9/1997 | Okazoe et al. | 55/229 X |

FOREIGN PATENT DOCUMENTS 59-53828  9/1984  Japan.

*Primary Examiner*—Richard L. Chiesa
*Attorney, Agent, or Firm*—Bell Seltzer Intellectual Property Law Group; Alston & Bird LLP

[57] ABSTRACT

An object of this invention is to provide a gas-liquid contact apparatus for use in wet flue gas desulfurizers and the like which is equipped with lightweight and inexpensive header pipes having excellent wear resistance and corrosion resistance and hence exhibits high reliability and economical efficiency. To this end, there is provided a gas-liquid contact apparatus wherein one or more header pipes having attached thereto a plurality of spray nozzles for spouting a slurry upward are disposed in the main body of a tower through which a gas flows, characterized in that the header pipes are made of a fiber-reinforced resin composite material and the outer surface thereof or the outer and inner surfaces thereof are formed of a corrosion-resistant and wear-resistant layer of a resin containing ceramic particles.

2 Claims, 2 Drawing Sheets

GAS-LIQUID CONTACT APPARATUS

FIELD OF THE INVENTION AND RELATED ART STATEMENT

This invention relates to a gas-liquid contact apparatus for use in wet flue gas desulfurizers and the like wherein one or more header pipes having attached thereto a plurality of spray nozzles for spouting a slurry upward are disposed in the main body of a tower through which a gas flows, and the header pipes are made of a fiber-reinforced resin composite material having improved corrosion resistance and wear resistance.

In recent years, wet flue gas desulfurizers wherein sulfur dioxide present in flue gas is removed by absorption into an absorbent slurry have become widely popular. In this type of desulfurizers, it is important to bring flue gas into efficient contact with an absorbent slurry. Accordingly, the present applicant has previously proposed a flue gas desulfurizer constructed so that a slurry is spouted upward in the main body of a tower through which a gas flows and hence capable of achieving an improvement in gas-liquid contact efficiency, a reduction in required volume, and a simplification of construction (see Japanese Utility Model Provisional Publication No. 59-53828/'84). FIG. 3 illustrates an essential part of an exemplary flue gas desulfurizer using a gas-liquid contact apparatus of such construction.

This flue gas desulfurizer is equipped with a tank 2 formed at the bottom of an absorption tower 1 and supplied with an absorbent slurry S containing, for example, limestone by means of a slurry feeding system; a circulating pump 4 for feeding absorbent slurry S within tank 2 to a main tower body 3 formed in the upper part of absorption tower 1 and bringing it into contact with flue gas; and a stirring rod 7 supported on the top plate of tank 2 through the medium of a rotating shaft 5, and rotated horizontally in absorbent slurry S within tank 2 by means of a motor 6. Moreover, ducts 8 and 9 serving as an inlet and an outlet for flue gas are installed at the top of main tower body 3 and at the top of a lateral part of tank 2, respectively, so that flue gas flows through main tower body 3 and over the surface of absorbent slurry S within tank 2.

Moreover, one or more header pipes 10 are disposed in main tower body 3 and connected to the delivery side of circulating pump 4. To each of these header pipes 10 are attached a plurality of spray nozzles 11 for spouting absorbent slurry S upward in the form of liquid columns. Thus, a gas-liquid contact apparatus for bringing flue gas into efficient contact with absorbent slurry S is constructed. In the above-described desulfurizer, the gas-liquid contact apparatus is usually equipped with a plurality of header pipes 10.

When used under relatively mild environmental conditions, for example, under such conditions that the liquid column height of absorbent slurry S is not greater than 1 m and the gypsum concentration in absorbent slurry S is not greater than 15% by weight, header pipes 10 have conventionally been made of a fiber-reinforced resin composite material (hereinafter referred to simply as FRP) such as common glass fiber-reinforced polyester resin, or a material comprising resin-lined carbon steel with exclusive consideration for corrosion resistance. However, under severe conditions which cause the liquid column height of absorbent slurry S and/or the gypsum concentration in absorbent slurry S to exceed the aforesaid limit, it has been common practice to use metallic materials (e.g., stainless steel and Hastelloy) having high hardness and exhibiting excellent wear resistance and corrosion resistance.

In this flue gas desulfurizer, untreated flue gas is introduced, for example, through duct 8, and brought into contact with absorbent slurry S fed by means of circulating pump 4 and spouted from spray nozzles 11, so that sulfur dioxide present in the untreated flue gas is removed by absorption into absorbent slurry S. The resulting flue gas is discharged through duct 9 as the treated flue gas. Absorbent slurry S spouted from spray nozzles 11 flows downward while absorbing sulfur dioxide, and enters tank 2 where it is oxidized by contact with a large number of air bubbles produced from air introduced into absorbent slurry S within tank 2 by an air supply (not shown) while being stirred with stirring rod 7. Thus, gypsum is formed as a by-product and withdrawn from the system.

During this process, absorbent slurry S is spouted upward from spray nozzles 11 in the form of liquid columns. The spouted absorbent slurry S scatters at its peaks and then falls, so that the falling absorbent slurry S and the spouted absorbent slurry S collide with each other to produce fine droplets. Thus, as compared with absorption towers of the packed tower type and the like, this apparatus shows an increase in gas-liquid contact area per unit volume in spite of its simple construction.

Moreover, since flue gas is effectively dragged into the spouted streams of absorbent slurry S in the neighborhood of nozzles 11, absorbent slurry S and the flue gas are effectively mixed. This effect also serves to enhance gas-liquid contact efficiency, so that even small-volume and simple absorption tower 1 can purify flue gas with a high degree of desulfurization. Furthermore, gas-liquid contact efficiency and hence the degree of desulfurization can be effectively varied by controlling the delivery pressure of circulating pump 4 or other parameter to alter the liquid column height of absorbent slurry S spouted from spray nozzles 11.

In the above-described conventional gas-liquid contact apparatus, under such conditions that the liquid column height of the absorbent slurry is unduly large, the gypsum concentration in the absorbent slurry is unduly high, and/or the circulation-rate of the absorbent slurry is so high as to give a high liquid flow velocity in header pipes 10, header pipes 10 need to be made of an expensive corrosion-resistant and wear-resistant material in order to prevent a decrease in reliability due to wear as well as corrosion. This disadvantageously causes an increase in material, manufacturing or processing cost and further in installation cost, resulting in reduced economical efficiency. More specifically, in cases where the liquid column height of absorbent slurry S is greater than 1 m, the gypsum concentration in absorbent slurry S is greater than 15% by weight, and/or the liquid flow velocity in header pipes 10 is greater than 2 m/sec, an expensive metallic material having high hardness and exhibiting excellent wear resistance has conventionally been used for header pipes 10, thus requiring considerable material, manufacturing and processing costs. Furthermore, in cases where corrosion resistance is desired under especially severe conditions, the reduction in economical efficiency become more marked because of the necessity of using a nickel alloy.

OBJECT AND SUMMARY OF THE INVENTION

In view of the above-described existing state of the art, an object of the present invention is to provide a gas-liquid contact apparatus which is equipped with lightweight and inexpensive header pipes having excellent wear resistance and corrosion resistance and hence exhibits high reliability and economical efficiency.

In order to accomplish the above object, the present invention provides:

(1) a gas-liquid contact apparatus wherein one or more header pipes having attached thereto a plurality of spray nozzles for spouting a slurry upward are disposed in the main body of a tower through which a gas flows, characterized in that the header pipes are made of a fiber-reinforced resin composite material and the outer surface thereof is formed of a corrosion-resistant and wear-resistant layer of a resin containing 5 to 90% by weight of ceramic particles; and (2) a gas-liquid contact apparatus wherein one or more header pipes having attached thereto a plurality of spray nozzles for spouting a slurry upward are disposed in the main body of a tower through which a gas flows, characterized in that the header pipes are made of a fiber-reinforced resin composite material and the outer and inner surfaces thereof are formed of a corrosion-resistant and wear-resistant layer of a resin containing 5 to 90% by weight and 1 to 70% by weight, respectively, of ceramic particles.

According to the present invention, a corrosion-resistant and wear-resistant layer is formed on the outer surface, or the outer and inner surfaces, of header pipes, so that wear of the outer surface of the header pipes due to the falling and impingement of an upwardly spouted slurry and/or wear of the inner surface of the header pipes due to friction caused by the flow of the slurry can be reduced. Consequently, the present invention makes it possible to secure wear resistance, using inexpensive and lightweight FRP with high impact resistance as a main body of a header pipe, and improves the economical efficiency and reliability of the gas-liquid contact apparatus and hence the desulfurizer.

DETAILED DESCRIPTION OF PREFERRED EMBODIMENTS

In the apparatus of the present invention, the header pipes are made of FRP and the outer surface thereof is formed of a corrosion-resistant and wear-resistant layer of a resin containing 5 to 90% by weight of ceramic particles, in order to reduce wear caused when the spouted absorbent slurry falls and impinges against the header pipes. Consequently, wear caused by the falling absorbent slurry can be reduced even under such conditions that the liquid column height of the spouted slurry is not less than 1 m.

Moreover, where a highly corrosive and wearing environment is created [e.g., where the flow velocity of the absorbent slurry fed to the header pipes is high or where the concentration of particles (such as gypsum) in the absorbent slurry is high], the inner surface of the header pipes, in addition to the outer surface thereof, is formed of a corrosion-resistant and wear-resistant layer of a resin containing 1 to 70% by weight of ceramic particles. Thus, wear caused when the absorbent slurry impinges against the inner surface of the header pipes can be markedly reduced even under such conditions that the flow velocity of the absorbent slurry fed to the header pipes is greater than 2 m/sec and/or the gypsum concentration in the absorbent slurry is greater than 15% by weight.

Figure 1:
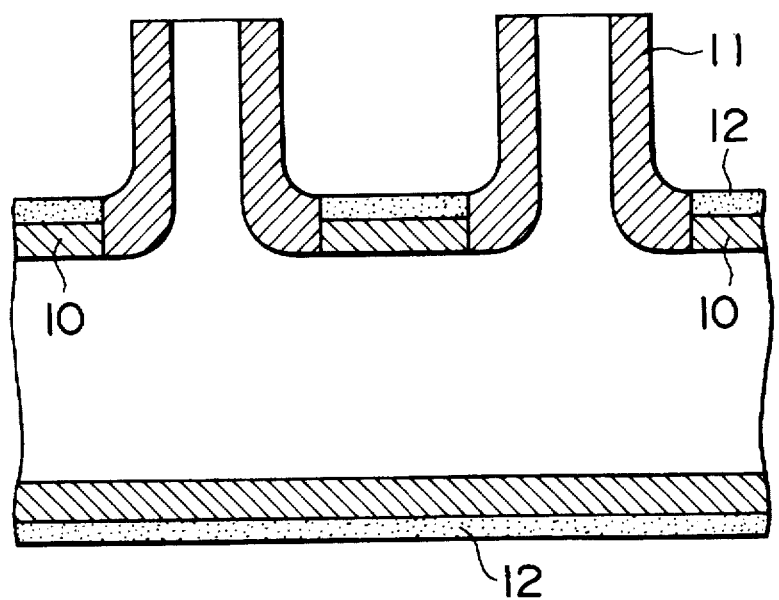
FIG. 1 is a sectional side view illustrating an essential part of a gas-liquid contact apparatus in accordance with one embodiment of the present invention.
Figure 2:
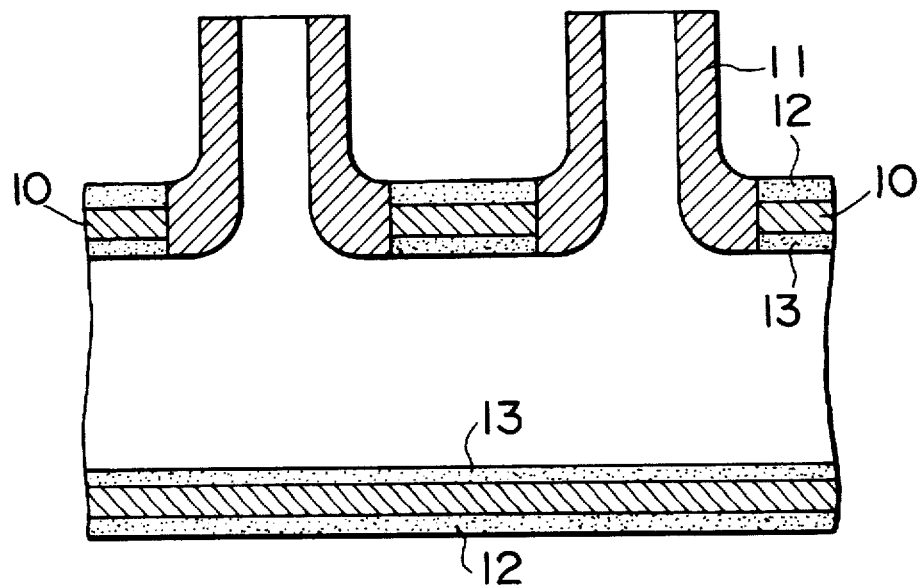
FIG. 2 is a sectional side view illustrating an essential part of a gas-liquid contact apparatus in accordance with another embodiment of the present invention.

Referring to FIGS. 1 and 2, the FRP used to make header pipes 10 in the gas-liquid contact apparatus of the present invention may be composed of a reinforcing fiber such as glass fiber, carbon fiber or an organic resin fiber (e.g., polyester fiber), and a resin component comprising a lpolyester resin such as unsaturated polyester resin, epoxyacrylate resin (=vinylester resin) or epoxy resin. Among others, FRP composed of glass fiber and a polyester or vinyl ester resin is preferred.

As the material of spray nozzles 11 attached to header pipes 10, there can be used a highly wear-resistant material selected from metallic materials, ceramics, rubber and the like.

The ceramic particles used to form a corrosion-resistant and wear-resistant layer on the outer surface, or on the outer and inner surfaces, of header pipes 10 made of the aforesaid FRP according to the present invention need to have a hardness higher than that of gypsum particles contained in the absorbent slurry. For example, alumina, silicon carbide, tungsten carbide and zirconia can preferably be used.

The content of the ceramic particles used to form the corrosion-resistant and wear-resistant layer may be suitably determined according to the properties and flow velocity of the absorbent slurry, the height to which it is spouted, and the like. The preferred range thereof somewhat varies between the outer surface and the inner surface of the header pipes, because of the difference in environmental conditions. The content in the outer surface is suitably in the range of 5 to 90% by weight and preferably 10 to 70% by weight. If it is less than 5% by weight, the amount of wear caused by the spouted and falling absorbent slurry becomes unduly large under such conditions that the liquid column height is not less than 1 m. If it is greater than 90% by weight, the application of the corrosion-resistant and wear-resistant layer becomes difficult, resulting in an increased processing cost. On the other hand, the content in the inner surface is suitably in the range of 1 to 70% by weight and preferably 5 to 70% by weight. If it is less than 1% by weight, the amount of wear becomes unduly large under such conditions that the flow velocity is not less than 2 m/sec and/or the gypsum concentration is not less than 15% by weight. On the other hand, since the inner surface usually undergoes less wear than the outer surface, sufficient wear resistance is obtained at a content of about 70% by weight.

As the resin used to form the corrosion-resistant and wear-resistant layer, there may be used any of the above-described resins which can be used for the resin component of FRP constituting header pipes 10. The corrosion-resistant and wear-resistant layer may or may not contain a reinforcing fiber. From the viewpoint of ease of fabrication, it is usually preferable that the corrosion-resistant and wear-resistant layer is formed of the same resin as the resin component of FRP constituting header pipes 10 and no reinforcing fiber is incorporated therein.

Header pipes 10 having ceramic particle-containing corrosion-resistant and wear-resistant layers 12 formed on the outer surface thereof according to the present invention can be made, for example, in the following manner. First of all, a mat, cloth or roving consisting of a reinforcing fiber such as glass fiber, carbon fiber or an organic resin fiber is impregnated with a resin such as an epoxy, polyester or vinyl ester resin, and then applied to or wound on the outer surface of a wooden mold having a diameter corresponding to the inside diameter of the header pipes according to a technique such as hand lay-up or winding. Thus, an FRP pipe 10 having a desired wall thickness is made.

Subsequently, 5 to 90% by weight of a ceramic material having a particle diameter of not greater than 1 mm, such as alumina, silicon carbide, tungsten carbide, zirconia or a mixture thereof, is mixed with any of the above-described resins, and the resulting mixture is applied to the outer surface of the FRP pipe with a trowel, brush, spray gun or the like. Thus, a corrosion-resistant and wear-resistant layer 12 consisting of a resin containing ceramic particles and having a thickness of 0.01 to 20 mm is formed on the outer surface of the FRP pipe.

The surfaces of the ceramic particles do not have to be treated by a silane compound or the like, which is commonly used to increase the interface adhesion between ceramic particles and resin. Either surface-treated or non-treated ceramic particles may be used.

Desirable mean particle diameter of the ceramic particles are variable depending on the condition for use. Since the ceramic particles are added in order to enhance wear-resistace of the corrosion-resistant layer, the desirable mean particle diameter thereof reflects on the targetted life time of the corrosion-resistant and wear-resistant layer, depending on a condition under which the gas-liquid contact apparatus is used. When the corrosion-resistant and wear-resistant layer is used for a high gypsum slurry concentration in the gas-liquid contact apparatus, the content of the ceramic particles should be increased in order to lengthen the life time thereof. When the content of the ceramic particles are as high as 90 wt % as shown in the example below, the ceramic particles having a mean particle diameter as large as 1 mm are not suitable. It is because the interspaces among the particles are too large to be filled with the remaining 10 wt % resin so that the resulting pores in the corrosion-resistant and wear-resistant layer remarkably lower the corrosion-resistance and wear-resistance thereof. Accordinly, when the high content of the ceramic particles are required, the ceramic particles having such a small mean particle diameter as 10 μm are desirable. On the other hand, when the content of the ceramic particles is low under the condition where the high wear-resistance is not rquired, the ceramic particles having a wide range of mean particle diameter from small to large may be used. It should be noted-that the larger particles tend to have better wear-resistance.

The thickness of the corrosion-resistant and wear-resistant layer may be determined by the required life time and wear-resistance thereof. From the view of fabrication and economy, the thickness of the corrosion-resistant and wear-resistant layer is practically in the range of 0.01 to 20 mm, preferably in the range of 1 to 5 mm. Accordingly, the mean particle diameter and the amount of the ceramic particles are also determined to obtain the desirable thickness.

Moreover, header pipes 10 having ceramic particle-containing corrosion-resistant and wear-resistant layers 12 and 13 formed on the outer and inner surfaces thereof according to the present invention can be made, for example, in the following manner. First of all, a ceramic material having a particle diameter of not greater than 1 mm, such as alumina, silicon carbide, tungsten carbide, zirconia or a mixture thereof, is mixed with a resin such as an epoxy, polyester or vinyl ester resin in the range of the ceramic material content of 1 to 70% by weight. Using a trowel, brush, spray gun or the like, the resulting mixture is applied to the outer surface of a wooden mold having a diameter corresponding to the inside diameter of the header pipes so as to give a thickness of 0.01 to 20 mm. Thus, an inner corrosion-resistant and wear-resistant layer 13 is formed.

Subsequently, a mat, cloth or roving consisting of a reinforcing fiber such as glass fiber, carbon fiber or an organic resin fiber is impregnated with a resin such as an epoxy, polyester or vinyl ester resin, and then applied to or wound on the aforesaid inner corrosion-resistant and wear-resistant layer 13 according to a technique such as hand lay-up or winding. Thus, an FRP pipe 10 having a desired all thickness is made. Finally, a corrosion-resistant and wear-resistant layer 12 consisting of a resin containing ceramic particles and having a thickness of 0.01 to 20 mm is formed on the outer surface of the FRP pipe in the same manner as described above.

Now, the present invention is more specifically explained in connection with an embodiment in which the gas-liquid contact apparatus of the present invention is applied to the flue gas desulfurizer illustrated in FIG. 3.

Figure 3:
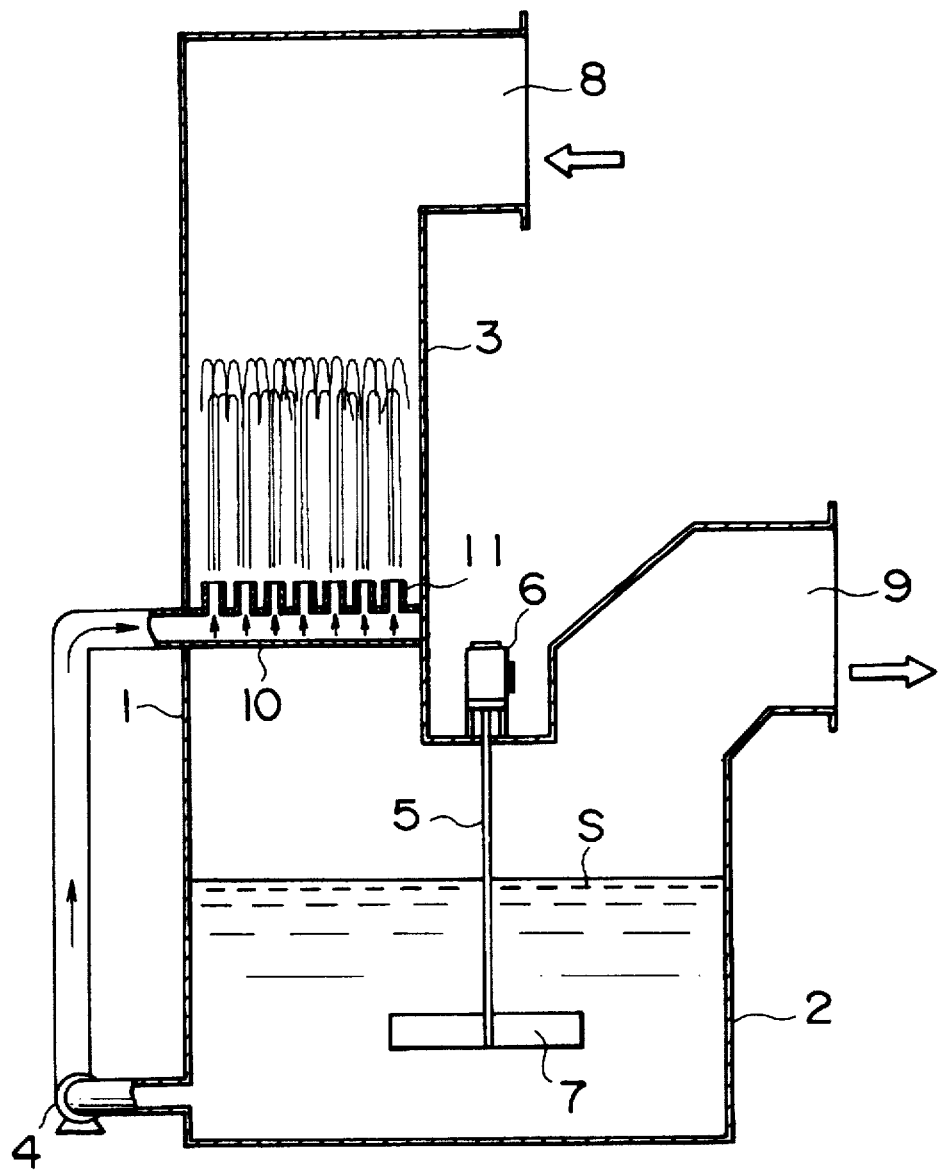
FIG. 3 is a schematic view illustrating an essential part of a conventional flue gas desulfurizer to which the gas-liquid contact apparatus of the present invention can be applied.

As shown in FIG. 3, header pipes 10 are pipes having attached to the upper side thereof a plurality of spray nozzles 11 for spouting an absorbent slurry in the main body 3 of a tower. In the gas-liquid contact apparatus of the present invention, header pipes 10 are made of FRP and the outer surface thereof is formed of a corrosion-resistant and wear-resistant layer 12 of a resin containing 5 to 90% by weight of ceramic particles as shown in FIG. 1. Alternatively, as shown in FIG. 2, the ouster surface thereof is formed of a corrosion-resistant and wear-resistant layer 12 of a resin containing 5 to 90% by weight of ceramic particles, and the inner surface thereof is formed of a corrosion-resistant and wear-resistant layer 13 of a resin containing 1 to 70% by weight of ceramic-particles. When a plurality of header pipes are used, they are not always disposed on the same plane.

In the above desulfurizer, untreated flue gas is introduced, for example, through a duct 8, and brought into contact with an absorbent slurry S fed by means of a circulating pump 4 and spouted upward from spray nozzles 11, so that sulfur dioxide present in the untreated flue gas is removed by absorption into absorbent slurry S. Thereafter, the resulting flue gas is discharged through a duct 9 as the treated flue gas.

During this process, corrosion-resistant and wear-resistant layer 12 formed on the outer surface of header pipes 10 prevents the FRP from being worn by the falling and impingement of the upwardly spouted absorbent slurry S. Moreover, corrosion-resistant and wear-resistant layer 13 formed on the inner surface of header pipes 10 prevents the FRP from being worn by the flow of absorbent slurry S under such conditions that the circulation rate of absorbent slurry S is increased so as to give a flow velocity of greater than 2 m/sec within header pipes 10 and/or the gypsum concentration in absorbent slurry S is greater than 15% by weight.

The gas-liquid contact apparatus of the present invention makes it possible to achieve high corrosion resistance and wear resistance, using inexpensive and lightweight FRP with high impact resistance as a main body of a header pipe. Thus, using a small-volume and simple absorption tower, the purification of flue gas can be performed with as high a degree of desulfurization as has been achievable in the prior art.

That is, the present invention enables header pipes made of FRP to satisfactorily withstand even a highly corrosive and wearing environment in which an absorbent slurry is spouted to a height of 1 m or greater, the flow velocity of a gypsum-containing absorbent slurry is greater than 2 m/sec, and/or the gypsum concentration therein is greater than 15% by weight, resulting in an improvement in the economical efficiency and reliability of the gas-liquid contact apparatus and hence the desulfurizer.

In order to demonstrate the effects of the present invention, the following example is given. The cereramic particles used in the example were not surface-treated.

EXAMPLE 1

Header pipes having the structure illustrated in FIG. 2 were made, and their wear properties were tested in testing apparatus having the construction illustrated in FIG. 3. The header pipes used in these tests were made as follows.

Using a bisphenol-based vinyl resin and ceramic particles as shown in Table 1, a ceramic particle-containing inner corrosion-resistant and wear-resistant layer 13 having a thickness of 3 mm was formed on the outer surface of a wooden mold having an outside diameter of 100 mm. Then, glass fiber impregnated with an isophthalic acid-based polyester resin was superposed thereon by hand lay-up to form an FRP layer 10 having a thickness of 10 mm. In addition, using the same bisphenol-based vinyl resin as used for the aforesaid inner corrosion-resistant and wear-resistant layer and ceramic particles as shown in Table 1, a ceramic particle-containing outer corrosion-resistant and wear-resistant layer 12 having a thickness of 3 mm was formed thereon. The header pipe so made had an overall length of 5 m, and nine spray nozzles were attached thereto at intervals of 0.5 m.

For testing purposes, header pipes made in the above-described manner and conventional header pipes made of the same FRP but containing no ceramic particles in the inner and outer surfaces thereof were installed in testing apparatus having the construction illustrated in FIG. 3. Then, the testing apparatus were operated for 6 months under such conditions that the gypsum concentration in absorbent slurry S ranged from 10 to 30% by weight, the height of the spouted absorbent slurry S ranged from 1 to 5 m, and the flow velocity of absorbent slurry S in the header pipes ranged from 1 to 3 m/sec. Thereafter, the amounts of wear of these header pipes were examined, and the results thus obtained with respect to the outer and inner surfaces are shown in Tables 1 and 2, respectively.

TABLE 1

| Test No. | Ceramic particle Type | Mean particle diameter (μm) | Content of ceramic particles in outer corrosion-resistant and wear-resistant layer (wt. %) | Gypsum concentration in absorbent slurry (wt. %) | Height of spouted absorbent slurry (m) | Water of outer surface after 6 months' testing (mm) |
|---|---|---|---|---|---|---|
| 1 | — | — | 0 | 10 | 1 | 0.15 |
| 2 | — | — | 0 | 15 | 1 | 0.5 |
| 3 | — | — | 0 | 30 | 1 | 0.8 |
| 4 | — | — | 0 | 30 | 5 | 5.4 |
| 5 | Alumina (Al$_2$O$_3$) | 100 | 1 | 15 | 1 | 0.2 |
| 6 | Al$_2$O$_3$ | 50 | 5 | 15 | 3 | 0.25 |
| 7 | Al$_2$O$_3$ | 50 | 20 | 20 | 5 | 0.2 |
| 8 | Al$_2$O$_3$ | 10 | 50 | 30 | 5 | 0.15 |
| 9 | Al$_2$O$_3$ | 10 | 70 | 30 | 5 | <0.1 |
| 10 | Al$_2$O$_3$ | 10 | 90 | 30 | 5 | <0.1 |
| 11 | Al$_2$O$_3$ | 10 | 50 | 30 | 1 | |
| 12 | Al$_2$O$_3$ | 10 | 50 | 20 | 5 | 0.15 |
| 13 | Al$_2$O$_3$ | 10 | 50 | 30 | 5 | 0.15 |
| 14 | Silicon carbide (SiC) | 100 | 5 | 15 | 1 | 0.1 |
| 15 | SiC | 10 | 90 | 30 | 5 | <0.1 |
| 16 | Tungsten carbide (WC) | 100 | 5 | 15 | 1 | 0.1 |
| 17 | WC | 10 | 90 | 30 | 5 | <0.1 |
| 18 | Alumina (Al$_2$O$_3$) | 100 | 5 | 15 | 3 | 0.25 |
| 19 | Al$_2$O$_3$ | 50 | 20 | 20 | 5 | 0.2 |

TABLE 2

| Test No. | Ceramic particle Type | Mean particle diameter (μm) | Content of ceramic particles in inner corrosion-resistant and wear-resistant layer (wt. %) | Gypsum concentration in absorbent slurry (wt. %) | Flow velocity of absorbent slurry in header pipe (m/sec) | Wear of inner surface after 6 months' testing (mm) |
| --- | --- | --- | --- | --- | --- | --- |
| 1 | — | — | 0 | 10 | 1 | 0.1 |
| 2 | — | — | 0 | 15 | 2 | 0.4 |
| 3 | — | — | 0 | 30 | 2 | 0.7 |
| 4 | — | — | 0 | 30 | 3 | 2.3 |
| 5 | Alumina ($Al_2O_3$) | 10 | 50 | 15 | 2 | <0.1 |
| 6 | $Al_2O_3$ | 10 | 50 | 15 | 2 | <0.1 |
| 7 | $Al_2O_3$ | 10 | 50 | 20 | 2 | <0.1 |
| 8 | $Al_2O_3$ | 10 | 50 | 30 | 3 | 0.1 |
| 9 | $Al_2O_3$ | 10 | 50 | 30 | 2 | <0.1 |
| 10 | $Al_2O_3$ | 10 | 50 | 30 | 2 | <0.1 |
| 11 | $Al_2O_3$ | 100 | 1 | 30 | 3 | 0.35 |
| 12 | $Al_2O_3$ | 50 | 20 | 20 | 2 | 0.2 |
| 13 | $Al_2O_3$ | 10 | 70 | 30 | 3 | <0.1 |
| 14 | Silicon carbide (SiC) | 100 | 1 | 15 | 2 | <0.1 |
| 15 | SiC | 10 | 70 | 30 | 3 | <0.1 |
| 16 | Tungsten carbide (WC) | 100 | 1 | 15 | 2 | <0.1 |
| 17 | WC | 10 | 70 | 30 | 3 | <0.1 |
| 18 | Alumina ($Al_2O_3$) | 100 | 5 | 15 | 2 | 0.1 |
| 19 | $Al_2O_3$ | 50 | 10 | 20 | 2 | <0.1 |

As shown in Table 1, under such conditions that the gypsum concentration in absorbent slurry S was not less than 15% by weight and the height of the spouted absorbent slurry S was not less than 1 m, only slight wear was caused in the header pipes containing not less than 5% by weight of ceramic particles (comprising alumina, silicon carbide or tungsten carbide) in the-outer surface thereof, whereas heavy wear damage was observed in the other header pipes.

Moreover, as shown in Table 2, when absorbent slurry S having a gypsum concentration of 15% by weight was made to flow through the header pipes at a flow velocity of not less than 2 m/sec, only slight wear was caused in the header pipes containing not less than 1% by weight of ceramic particles (comprising alumina, silicon carbide or tungsten carbide) in the inner surface thereof, whereas heavy wear damage was observed in the other header pipes.

We claim:

1. A gas-liquid contact apparatus wherein one or more header pipes having attached thereto a plurality of spray nozzles for spouting a slurry upward are disposed in the main body of a tower through which a gas flows, characterized in that said header pipes are made of a fiber-reinforced resin composite material and the outer surface thereof is formed of a corrosion-resistant and wear-resistant layer of a resin containing 5 to 90% by weight of ceramic particles.

2. A gas-liquid contact apparatus wherein one or more header pipes having attached thereto a plurality of spray nozzles for spouting a slurry upward are disposed in the main body of a tower through which a gas flows, characterized in that said header pipes are made of a fiber-reinforced resin composite material and the outer and inner surfaces thereof are formed of a corrosion-resistant and wear-resistant layer of a resin containing 5 to 90% by weight and 1 to 70% by weight, respectively, of ceramic particles.

* * * * *

UNITED STATES PATENT AND TRADEMARK OFFICE
CERTIFICATE OF CORRECTION

PATENT NO. : 5,785,901
DATED : July 28, 1998
INVENTOR(S) : Hasegawa et al.

It is certified that error appears in the above-identified patent and that said Letters Patent is hereby corrected as shown below:

Title page, item [75]:

Inventors, "Noohiko" should read --Naohiko--.

Signed and Sealed this

Nineteenth Day of October, 1999

Attest:

Q. TODD DICKINSON

*Attesting Officer*    *Acting Commissioner of Patents and Trademarks*